United States Patent [19]
Trunnell

[11] 3,889,982
[45] June 17, 1975

[54] PIPE COUPLER

[76] Inventor: Harold K. Trunnell, 3520 Knob Hill Ln., Eugene, Oreg. 97405

[22] Filed: Apr. 23, 1973

[21] Appl. No.: 353,593

Related U.S. Application Data

[63] Continuation-in-part of Ser. No. 231,636, March 3, 1972, abandoned.

[52] U.S. Cl. ................................. 285/5; 285/173
[51] Int. Cl. ............................................. B05b 15/00
[58] Field of Search ................ 285/173, 329, 5, 61

[56] References Cited
UNITED STATES PATENTS

| 3,178,206 | 4/1965 | Martin et al. | 285/173 |
| 3,490,794 | 1/1970 | Swanson | 285/173 |

Primary Examiner—Patrick D. Lawson
Attorney, Agent, or Firm—Kolisch, Hartwell, Dickinson & Stuart

[57] ABSTRACT

A coupler to be used in connecting the ends of pipe sections. The coupler includes a collar member and a tubular member with a portion of the tubular member adjacent one end snugly fitted within the collar member. The tubular member is defined by an integral wall extending circumferentially thereof. A lip expanse formed in this integral wall joining with the portion of the tubular member which seats within the collar member abuts one end of the collar member. The tubular member further includes a shoulder between its ends bounded on one side by an annular expanse which abuts the other end of the collar member. The tubular member and collar member are interconnected whereby torque may be transmitted between the two, and the collar member includes torque-transmitting elements presented thereon enabling torque to be applied through the coupler. A method of making such a coupler where the annular expanse of the shoulder and the lip expanse compressively hold opposite ends of the collar member which is seated between these two expanses.

4 Claims, 6 Drawing Figures

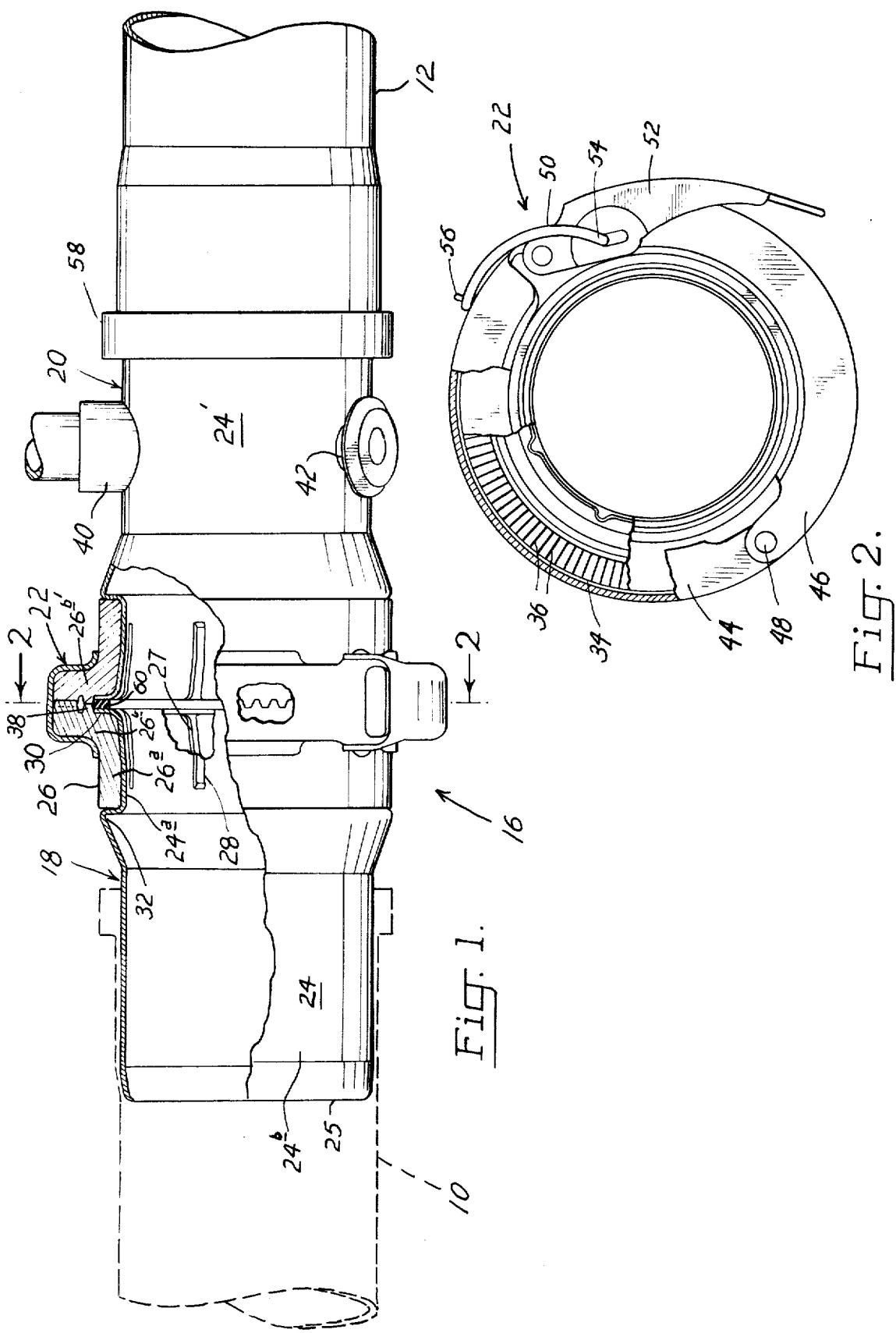

3,889,982

PIPE COUPLER

The present application is a continuation-in-part of a copending application of applicant filed Mar. 3, 1972 having Ser. No. 231,636, now abandoned.

This invention relates to a coupler, of the type that may be used to make a coupled connection between the ends of two pipe sections.

More specifically, the invention concerns a coupler as above indicated which is adapted to transmit torque between the coupled pipe sections.

Explaining a particular embodiment of the invention, irrigation systems have been proposed in the form of an elongated expanse of aluminum pipe supported on wheel structures provided at intervals along the length of the pipe. The wheel structures are rolled over the ground to produce side movement of the irrigation pipe when it is desired to reposition the pipe. The usual irrigation pipe or line comprises multiple aluminum pipe sections disposed end-to-end, which are coupled together to make the continuous expanse of pipe. Typically, drive to operate the wheel structure supporting the pipe is transmitted through the irrigation pipe. This means that the couplers used to couple two pipe sections together must be capable of transmitting a driving torque from one to the other pipe section. Furthermore, because the elongated expanse of pipe usually does not move uniformly over the ground, considerable stresses are developed in a direction extending axially of various pipe sections.

Problems have been experienced in the design and construction of couplers used in making such a coupled connection between two pipe sections. Describing a conventional coupler, such is usually in the form of an integral cast aluminum body including a hollow slightly tapered tubular extension which is press fitted into the end of a pipe section. The slightly tapered profile of the tubular extension is dictated by the practicalities of normal casting procedures. The shape, however, is detrimental to a coupler, since the pipe section when pressed over such an extension is not uniformly gripped along the area of the pipe section that overlaps the extension. The result is a tendency for relative displacement to occur, with failure of the connection.

With an all aluminum cast body used as a coupler, difficulties are also encountered in forcing the end of an aluminum pipe section over the extension discussed. Considerable friction is encountered when the aluminum pipe section is forced into place, to a great measure attributable to the galling action which takes place when two aluminum parts are pressed against each other. Because of this galling action, even if the pipe section is properly finally positioned on the coupler, during the process material tends to be worn off on the opposing aluminum surfaces that move over each other, serving to weaken the connection that ultimately is established. In this connection, it should be remembered that torque ranging from around 30,000 to 50,000 inch pounds are common in existing irrigation systems, and any weakening, or introduction of localized high stress regions, in an irrigation pipe section where it joins with a coupler will seriously effect the reliability of the irrigation line.

A general object and feature of the instant invention is to provide a novel coupler adapted for use with pipe sections in connecting them end-to-end, which obviates many of the difficulties and problems characterizing currently known couplers.

Another object of the invention is to provide a coupler which includes as one element a tubular member defined by an integral wall extending circumferentially in the tubular member, and as another element a collar member which a portion of said tubular member fits within. A protruding part of the tubular member is adapted to have fitted over it the end of a pipe section. The tubular member and collar member are firmly held together whereby torque may be transmitted between the two, and the collar member may be provided with means for transmitting torque through the coupler to another coupler coupled to it.

With the above-indicated organization, and in a preferred and specific embodiment of the invention, the two part coupler may include a tubular member made of steel which has the required strength to transmit the torques normally encountered, and which can be slid within an aluminum pipe section without the galling problems normally experienced. The collar member may be cast of aluminum or other lightweight material. This enables the entire coupler to have a mass comparable to a conventional coupler. With the tubular member being made of steel, in addition to the advantages already described, the wall thickness of the member may be minimized to introduce minimal restriction to flow through a coupled pipe section.

Another object of the invention is to provide a coupler made up of a tubular member and a collar member as indicated, wherein the tubular member between its ends is formed with a shoulder, which cooperates with a turned-over lip at an extreme end of the tubular member, firmly to grip the collar member which is seated between these two portions. In constructing the coupler, an annular expanse in the shoulder described may be formed against an end of the collar member in such a manner as, in combination with the lip, compressively to hold the collar member which is seated between the two.

The invention further contemplates a novel method for making such a coupler, enabling the production of a compressive fit of the annular expanse of the shoulder and lip described against opposite ends of the collar member.

In an irrigation line including two pipe sections coupled together with couplings of the type described, an elastomer seal may be interposed between the turned-over lips of adjacent couplers to form a fluid-tight joint where the two couplers meet.

Various other objects and advantages will become more fully apparent as the following description is read in conjunction with the accompanying drawings, wherein:

FIG. 1 illustrates, with portions broken away, the adjacent ends of a pair of aligned irrigation pipe sections, the two sections being provided with a pair of mating couplers as contemplated according to an embodiment of the invention;

FIG. 2 is a view taken generally along the line 2—2 in FIG. 1;

Figure 3:
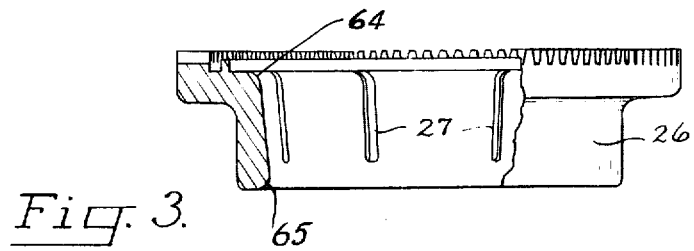
FIG. 3 is a view showing a collar member in a coupler.

Turning now to the drawings, illustrated at 10 and 12 are the adjacent extremities of a pair of irrigation pipe sections. Together these make up part of an expanse of irrigation pipe or line of the type found in an irrigation system. Such pipe sections are ordinarily made up of aluminum, to minimize the weight of the sections, thus to facilitate their handling in the field. Not shown, but to be understood as ordinarily forming a part of an irrigation system, are multiple wheel structures provided at spaced intervals along the length of the irrigation pipe. These wheel structures may include enlarged wheels which support the pipe in a position elevated over the ground, and accommodate with side rolling or lateral moving of the pipe to place the pipe in a new position on a field.

In an irrigation system of the type described, a motor-operated mover is provided which is actuated to turn the pipe. The pipe itself is supported on the wheel structures mentioned in such a way that on turning of the pipe about its longitudinal axis, rotary movement is imparted to one or more wheels in the various wheel structures that support the pipe. Thus it is rotary movement of the irrigation pipe or line that powers the side movement. When it is remembered that the pipe or line has considerable length when finally assembled, and that the pipe itself over the extent of its length is usually bent and twisted to accommodate changes in grade, and that the wheels that support the pipe travel over relatively uneven terrain, it can easily be seen that the pipe is subjected to severe stressing during normal irrigation use, in a direction extending axially of the pipe, as well as in a circumferential direction by reason of torque being transmitted through the pipe.

In FIG. 1 a coupling connection given the reference numeral 16 is shown interposed between the adjacent ends of pipe sections 10 and 12. The coupling connection can be disassembled to permit separation of the pipe sections. This operation is performed when the irrigation system is broken down to prepare it for storage or moving from one field to another.

Coupling connection 16 comprises a coupler 18 on the end of pipe section 10, a coupler 20 mounted on the end of pipe section 12, and a releasable clamp 22 used in securely uniting the two couplers.

The two couplers 18 and 20 are quite similar in construction. As can be seen with reference to coupler 18, each comprises an elongated hollow member referred to herein as a tubular member, shown at 24, and firmly secured to this tubular member adjacent one end a collar or collar member 26.

Describing tubular member 24, and when such forms part of a coupler used in joining aluminum pipe sections, in a preferred embodiment it is contemplated that such be made of steel, such as the mild steel used in the manufacture of rolled steel pipe. The tubular member, as illustrated in FIG. 1, is defined by an integral wall extending circumferentially in the tubular member whereby there is absent in the member any lap joint or any other mechanical means forming a seam in the wall that makes up the member. This permits forming of the tubular member, in a method described in greater detail below, whereby the member positively grips onto the collar which is seated about the tubular member. In the completed coupler, and referring to FIG. 1, it will be seen that a portion 24a (also referred to herein as a sleeve portion) adjacent the right end of the tubular member fits snugly within the annular bore which extends through the collar. Portion or section 24b of the tubular member shown at the left in FIG. 1 is an exposed portion in the coupler, in that it lies outside the collar. This end portion 24b is circumferentially smoothly contoured and constitutes a pipe-receiving section or portion of the tubular member which is adapted to have the end of a pipe section snugly fitted thereabout. Ordinarily this end portion 24b of the tubular member may have a substantially uniform diameter throughout substantially its entire length. The provision of a slightly beveled region 25 at the extreme outer end of portion 24b has been found to promote the initial easy insertion of the member inside the end of a pipe section during the mounting of a pipe section on the coupler.

Collar 26 includes an annular rim portion 26a and integrally joined to the rim portion at the right end of the collar in FIG. 1 a radially outwardly projecting flange portion 26b. The bore which extends through the collar, more specifically the rim portion of the collar, may be provided at circumferentially spaced locations about its interior with axially extending channels, exemplified by the channels shown at 27. The tubular member, more specifically the sleeve portion which seats within this bore, is shaped to have elongated complementing flanges or ridges 28 which seat within the channels in the collar with the coupler assembled.

Further describing the mounting of the collar on tubular member 24, the right end of the tubular member is defined by a lip or lip expanse 30 which is turned over to lie in a plane substantially normal to the axis of the tubular member. This lip or lip expanse abuts the right end of the coupler as shown in FIG. 1. Because the tubular member is defined by an integral wall, with the lip expanse turned over as described, such snugly fits against the collar about the entire circumference of the lip expanse.

With continued reference to FIG. 1, the tubular member is further shaped to have a shoulder such as the one shown at 32 intermediate sleeve portion 24a and the pipe-receiving portion or section 24b. This shoulder includes an annular expanse joining with the sleeve portion of the coupler and formed in the integral wall of the sleeve member which lies in a plane substantially normal to the axis of the coupler, thus in a plane substantially parallel to the lip expanse earlier described. Completing the shoulder is a tapering skirt joining with the outer margin of the annular expanse, which inwardly tapers progressing away from the annular expanse to meet the region of joinder of this skirt with pipe-receiving portion 24b.

It will be noted from the construction that has been described that in effect the lip expanse and the annular expanse of shoulder 32 define an annular channel extending about the tubular member which has the collar seated therewithin. The collar, therefore, is locked in place by the lip expanse and annular expanse, in a manner preventing relative axial displacement. The tubular member further is strengthened in a manner which inhibits any reduction in diameter in that portion of the tubular member which extends through the collar, such as might cause loosening of the mounting of the collar about tubular member 24. Further explaining, on a torque being applied to the tubular member such could result in a twist being applied to the member with diameter reduction. The lip and shoulder inhibit such from happening.

With the collar seated about the sleeve member as described, the channels 27 and ridges in the tubular member constitute means mechanically locking the two members together whereby torque may be transmitted between the two.

Considering now further details of the collar, flange portion 26b of the collar has a face 34 which lies in a plane extending normal to the axis of members 24 and 26. Cast into this face are teeth 36 equally circumferentially spaced about the flange portion. Radially inwardly from the row of teeth and directly outwardly of the perimeter of turned-over lip expanse 30 is an annular ridge 38 used in the containment of a seal, to be described.

Coupler 20 is quite similar to coupler 18. The coupler differs primarily in that the tubular member 24' shown is somewhat longer than member 24 of coupler 18. Further, the coupler is provided with an outlet 40 which receives the stand pipe for a sprinkler outlet, and valve mechanism 42 which opens up on water pressure dropping in the line to permit draining of the line.

The two fittings may be locked together using the clamp 22. Such includes a pair of semicircular sections 44, 46 hinged at 48, the two sections having a generally channel-shaped cross section. In operative coupled position, the two couplers 18, 20 are set end-to-end, with the teeth presented on the face of one flange portion 26b meshing with mating teeth provided in flange portion 26b'. The clamp sections 44, 46 are seated in a position embracing the peripheries of flange portions 26b, 26b' of the two couplers. The two sections are latched together through latch 50 supported on a latch arm 52 hinged at 54 to clamp section 46, the latch engaging a catch 56 on clamp section 44.

A coupler is mounted on the end of a pipe section through forcing the exposed outer end of the tubular member axially into the pipe section. The pipe section slides over the tubular member until it reaches its final seated position, which is the position shown. To assure a tight fit, an outer diameter is selected for the pipe-receiving portion or section of the tubular member which slightly exceeds the inner diameter of the pipe section before mounting. Thus, the end of the pipe section enlarges slightly during the mounting process. A band, such as band 58, may also be provided embracing the outer surface of the pipe section with such in a finally seated position.

To establish a coupled connection between the ends of two pipe section equipped with couplers as described, the pipe sections are disposed in an axially aligned position end to end with the teeth of the flanges in the mating couplers engaging. Between the faces of the two flanges and elastomer seal, such as the seal shown at 60, is mounted, with such seating on the turned-over lips 30 of the pipe sections and radially inwardly of ridges 38. With the releasable clamp secured in place, the couplers become securely fixed together, with the engaging teeth on the faces of the coupler flanges providing a means for transmitting torque from one to the other coupler. The joint is made water tight because of the seal which is seated between the couplers.

Referring now to FIGS. 3, 4, 5, and 6, these figures illustrate a preferred form of process for making the coupler described, whereby a compressive fit exists between the lip expanse and annular expanse in the tubular member and the collar which embraces portion 26a of the tubular member. The presence of this compressive fit is most important in obtaining a long useful life in the coupler, since it prevents any play from developing between the collar and the sleeve member such as would ultimately result in undesirable loosening between these two members.

Figure 4:
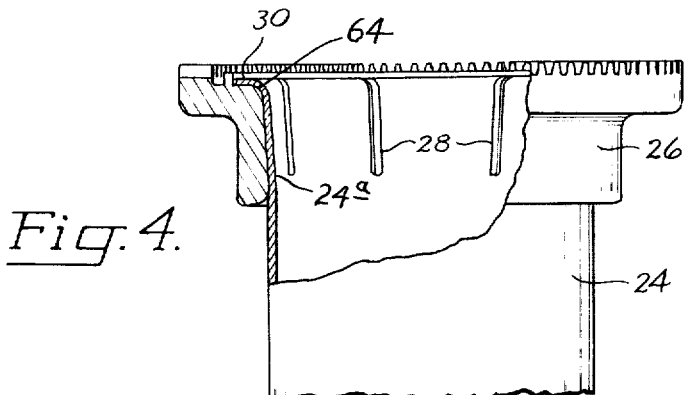
FIG. 4 shows a tubular member inserted within a collar member, according to a manufacturing method that can be used in making the coupler.

As earlier described, collar 26 may be an aluminum casting, and such may be cast to have the internal channels 27 which serve as part of the means for transmitting torque from the sleeve member to the collar. FIG. 3 shows the collar alone, as produced by the casting process. Tubular member 24 may be initially formed, as with a press, to have the turned-over lip expanse 30 and externally projecting axially extending splines or ridges 28. The tubular member at this stage of the manufacturing process may have a substantially uniform diameter, which is the diameter of sleeve portion 24a or that portion which fits within the collar. Portions of the tubular member, as it appears with such a diameter and with the formed lip expanse and ridges, are shown in FIG. 4.

With the tubular member so-prepared, such may be assembled with the collar by passing the tubular member through the interior of the collar, until lip expanse 30 comes up against an end of the collar. This is done with registering of the external splines or ridges 28 in tubular member 24 with the channels 27 provided in the collar. This assembly of tubular member and collar is illustrated in FIG. 4.

Shoulder 32 earlier described may then be prepared through the steps of first enlarging the diameter of the tubular member where such extends beyond the collar, to a diameter which exceeds the diameter of the bore in the collar, as by inserting a punch or dye 61 into the interior of the tubular member from that end which is exposed beyond the collar and forcing such axially toward the collar. The bore which extends through the collar, when such opens to each of opposite ends of the collar, is bounded by an edge of rounded convex profile, as designated at 64 and 65 in FIG. 3. Lip expanse 30 joins with the remainder of the tubular member through a rounded bend, and this rounded bend seats on rounded edge 64. With enlargement of the diameter of the tubular member by punch 61, the wall of the tubular member is caused to be expanded as shown at 63 in FIG. 5, the wall bending about rounded edge 65 and extending in an annular flaring expanse 66 where the wall joins sleeve portion 24a with portion 63 of enlarged diameter.

Figure 6:
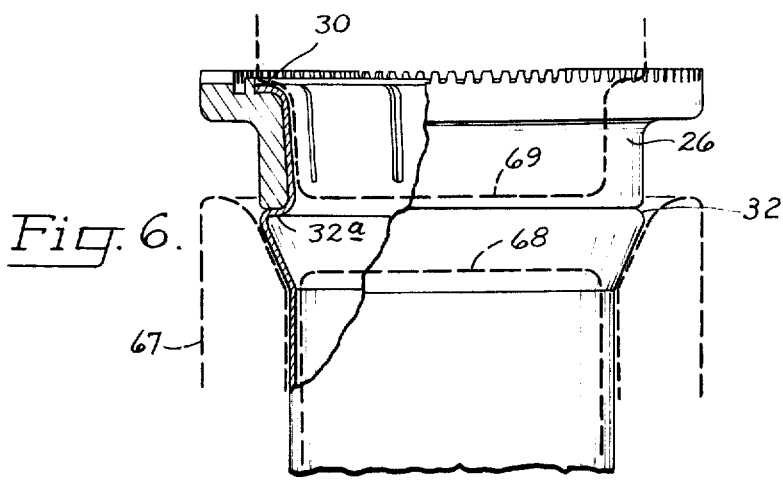

After such enlargement, the enlarged protruding portion of the tubular member is constricted, as by the use of external and internal dies 67, 68, which are forced axially along the tubular member progressing from the free end of enlarged portion 63, or in an upward direction as viewed in FIG. 6. This results in working of the wall of the tubular member in a direction progressing toward the collar. With this working, a wave of material is produced in front of the dies as such move toward the collar. As the dies approach the collar, this wave of material is forced against an end of the collar, to produce the shoulder 32 which is pictured in FIG. 6, and the annular expanse 32a which bounds one side of the shoulder lying in a plane normal to the axis of the collar and abutting one end of the collar. During constriction of the tubular member (as well as during enlargement with die 61), the opposite end of the tubular member, i.e., its lip expanse where the same abuts the opposite end of the collar, is confined. For instance, a supporting die as is shown at 69 may be provided, which includes portions fitting within sleeve portion 24a and abutting against lip expanse 30, which counteracts axial and other forces generated by dies 67, 68. As a consequence of the process described, the lip expanse and annular expanse 32a of the shoulder are placed in a condition compressing the collar, more specifically the rim portion of the collar lying between them.

Figure 5:
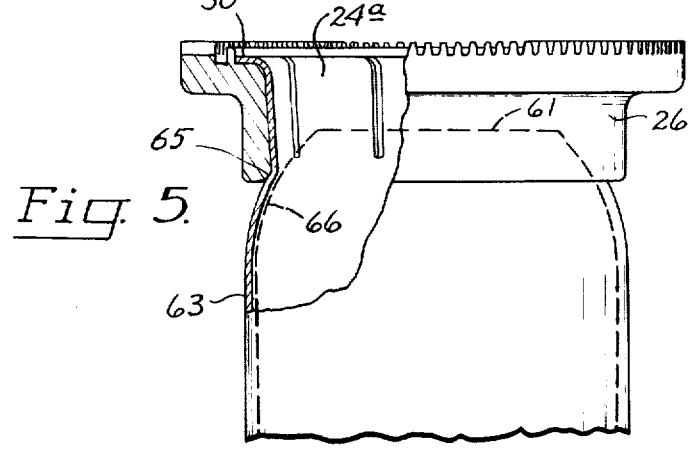
FIGS. 5 and 6 illustrate diagramatically additional manufacturing steps that may be carried out in making the coupler.

With forming of shoulder 32, the expanse of material 66 present in the tubular member as the result of the operation pictured in FIG. 5 is caused to be bent around convex edge 65. In this way, during the production of the compressive fit of the collar between the lip expanse and the shoulder, the wall of the tubular member is prevented from being creased or turned over in a sharp fold. This produces the very important result of inhibiting the formation of a high stress region where the tubular member is formed about the end of the collar in the final coupler. With the usual mild steel, and with a wall thickness in the one-sixteenth inch to one-eighth inch in the tubular member of the coupler as finally prepared, optimumly the round in the profile of edge 65 (and edge 64) curves about a radius of one-sixteeth inch or more.

With the coupler as finally prepared, the diameter of the exposed end of the tubular member is returned essentially to the diameter of the tubular member when it was first inserted through the collar. The shoulder is prepared with an annular expanse bounding one side which parallels the lip expanse provided at the opposite end of the tubular member. This annular expanse and lip expanse compressively grip the collar which is between them. With the final construction, minimal opportunity is provided for the tubular member to work with respect to the collar to introduce a looseness which ultimately might cause failure of the coupler. The method of manufacture described has the additional advantage of minimizing reduction in wall thickness in the region where shoulder 32 (including its wall 32a) is formed.

It is claimed and desired to secure by Letters Patent:

1. The combination of
   a pair of axially aligned aluminum pipe sections,
   a steel tubular member for each pipe section having one end snugly fitted within an end of its associated pipe section and an opposite end protruding outwardly from the pipe section,
   a collar member mounted on each tubular member including an annular rim portion concentric with and snugly encompassing the said opposite end of the tubular member and an annular flange portion joined to the rim portion radiating outwardly from an end of said rim portion, said flange portion having a face lying in a plane normal to the axis of the rim portion with torque-transmitting elements presented thereon, said faces of the collar members for the two pipe sections being in oppositely disposed relation,
   indent-detent means on each tubular member and its associated collar member mechanically securing the two for the transmission of torque between them, said indent-detent means comprising a plurality of channels provided along the inner surface of the rim portion, said channels extending axially from one end of the rim portion to a location intermediate said one end and the opposite end, and ridges formed in the tubular member fitting within said channels,
   each tubular member having a turned over lip at its said opposite end turned over an end of its associated rim portion, the lips of the two tubular members being in oppositely disposed relation, each tubular member further having an annular shoulder formed therein abutting the opposite end of its associated rim portion,
   and a clamp encircling the annular flanges of the two collar members detachably locking them together.

2. A coupler as claimed in claim 1 wherein an elastomer seal is interposed between the two lips disposed radially inwardly of said torque-transmitting elements.

3. A coupler for connecting the ends of pipe sections comprising
   an annular collar member having axially spaced opposed ends,
   a tubular member defined by an integral wall extending circumferentially of the member, said tubular member including a sleeve portion adjacent one end of the tubular member inserted through and snugly encompassed by the collar member and a lip expanse formed in said integral wall joining with said sleeve portion which is turned over to lie against one end of the collar member in a plane normal to the axis of the collar member, said tubular member further including an annular expanse formed in said integral wall which lies in a plane paralleling said plane of the lip expanse and which abuts the opposite end of the collar member, said lip and annular expanses in said integral wall positively locking the collar member for relative axial displacement with respect to said tubular member,
   said tubular member further having a circumferential smoothly contoured pipe-receiving portion forming its other end which is exposed outwardly of the collar member and is adapted to have a pipe snugly fitted thereabout,
   mechanical means interconnecting the collar and tubular members whereby torque may be transmitted between the two, and
   means on the collar member for transmitting torque through the coupler.

4. A coupler for connecting the ends of pipe sections comprising,
   an annular collar member with an axially extending bore and bounded at opposite ends by opposite end margins which are substantially normal to the axis of the collar,
   a tubular member defined by an integral wall extending circumferentially in the tubular member,
   said tubular member having a sleeve portion adjacent one end thereof snugly fitted within the bore of said collar member and a continuous lip expanse formed in said integral wall joining with said sleeve portion turned over to lie against one of said end margins of the collar member,
   said tubular member further including an annular expanse formed in said integral wall which lies against the other of said end margins and which in cooperation with said lip expanse compresses said collar member, said bore where it meets with said other end margin being bounded by an edge of rounded convex profile, said annular expanse joining with said sleeve portion in a bend region which curves over said rounded edge.

means interconnecting the collar and tubular members whereby torque may be transmitted between the two, and means on the collar member for transmitting torque through the coupler.

* * * * *